(12) United States Patent
Yoo

(10) Patent No.: US 8,284,454 B2
(45) Date of Patent: Oct. 9, 2012

(54) IMAGE FORMING APPARATUS AND METHOD OF CONTROLLING THE SAME

(75) Inventor: Seung Cheol Yoo, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 784 days.

(21) Appl. No.: 12/174,838

(22) Filed: Jul. 17, 2008

(65) Prior Publication Data

US 2009/0059306 A1 Mar. 5, 2009

(30) Foreign Application Priority Data

Sep. 4, 2007 (KR) .................. 10-2007-0089658

(51) Int. Cl.
*G06K 15/00* (2006.01)
(52) U.S. Cl. ......... 358/3.26; 358/2.1; 347/235; 345/429
(58) Field of Classification Search ............... 358/3.26, 358/2.1; 347/235; 345/429
See application file for complete search history.

(56) References Cited

U.S. PATENT DOCUMENTS 5,986,665 A * 11/1999 Wrey et al. ............ 345/581
2007/0046769 A1* 3/2007 Park et al. ............. 347/235

FOREIGN PATENT DOCUMENTS

KR 2005-73182 7/2005

OTHER PUBLICATIONS

Korean Office Action issued in Korean Patent Application No. 10-2007-0089658 on Sep. 10, 2011.

* cited by examiner

*Primary Examiner* — Twyler Haskins
*Assistant Examiner* — Michael Burleson
(74) *Attorney, Agent, or Firm* — Stanzione & Kim, LLP

(57) ABSTRACT

An image forming apparatus includes a hyper print video controller (HPVC) to generate video data from input data, an engine controller to compensate for a dot offset of the video data and to output the dot offset-compensated video data, and a laser scanning unit to perform a print operation according to the dot offset compensated video data. Therefore, HPVC size is reduced so that chip size can be reduced. This reduction in size accordingly reduces power consumption, and enhances chip efficiency.

18 Claims, 6 Drawing Sheets

IMAGE FORMING APPARATUS AND METHOD OF CONTROLLING THE SAME

CROSS-REFERENCE TO RELATED APPLICATIONS

This application claims priority under 35 U.S.C. §119(a) from Korean Patent Application No. 2007-89658, filed on Sep. 4, 2007 in the Korean Intellectual Property Office, the disclosure of which is incorporated herein in its entirety by reference.

BACKGROUND OF THE INVENTION

1. Field of the Invention

The present general inventive concept relates to image processing systems, and more particularly, to an image forming apparatus to enhance a degree of integration and efficiency of a hyper print video controller (HPVC) during generation of video data from input data.

2. Description of the Related Art

Generally, an image forming apparatus prints video data in 1-, 2-, 4-, and 8-laser beam mode according to each set. However, due to a certain mechanical or electric effect, the laser beam of the image forming apparatus starts to print video data in a dot position different from the set position.

The conventional image forming apparatus compensates for this problem with a sub-module, serving as a buffer, installed in a hyper print video controller (HPVC). The video data generated in the HPVC is processed through a buffer in the HPVC to compensate for the dots, the buffer being in a range from a minimum "0" to a maximum "128," generated by a difference between laser beams.

When video data is printed as print material, dots between laser beams are printed in different positions, due to a mechanical or electromagnetic effect, etc. Since video data is printed synchronously with a video clock (VCLK), a buffer compensating for dots is generally configured to include 128 flip-flops. Although this different position printing phenomenon appears generally in 5 dots, the buffer is designed to compensate for 128 dots. Therefore, in order to compensate for two dots, the buffer is set such that video data can pass two flip-flops.

However, the conventional image forming apparatus requires as many as 128 flip-flops to compensate for dots, and this causes a great number of gate counts during a chip lay out. When a number of gate counts is increased, a size of a chip included in the buffer must also be increased; energy consumption therefore increases; and the degree of integration and the efficiency of the chip are reduced.

SUMMARY OF THE INVENTION

The general inventive concept provides an image forming apparatus to perform a dot compensating operation through an engine controller, connected to an end portion of a hyper print video controller (HPVC), without a dot compensating buffer to enhance a degree of integration and efficiency of the HPVC, and also to provide a method of controlling the image forming apparatus.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image forming apparatus including a hyper print video controller (HPVC) to generate video data from input data, an engine controller to compensate for a dot offset of the video data and to output the dot offset-compensated video data, and a laser scanning unit to perform a print operation according to the dot offset-compensated video data.

The foregoing and/or other aspects and utilities of the general inventive concept may also be achieved by providing an image forming apparatus including a hyper print video controller (HPVC) to generate video data from input data, an engine controller to compensate for a dot offset of the video data and to output the dot offset-compensated video data, and a laser scanning unit to perform a print operation according to the dot offset-compensated video data. Here, the engine controller includes a dot compensating unit to delay periods of a video clock of a ring oscillator providing a reference video clock to the engine controller by a number of dots, and to compensate for the dot offset. Also, the dot compensating unit delays N periods of the video clock and compensates for N dot delays.

The foregoing and/or other aspects and utilities of the general inventive concept may also be achieved by providing a method of controlling an image forming apparatus, the method including generating video data from input data in a hyper print video controller (HPVC) and outputting the video data, compensating for a dot offset of the video data in an engine controller, and outputting the dot offset-compensated video data, and performing a printing operation through a laser scanning unit, according to the dot offset-compensated video data.

The foregoing and/or other aspects and utilities of the general inventive concept may also be achieved by providing an image forming apparatus including a hyper print video controller (HPVC) to receive input data and a clock signal, and to generate video data from the input data, and an engine controller to provide dot compensation for a dot offset of the video data and to output the dot offset-compensated video data, wherein the dot compensation is performed without a dot compensating buffer.

The engine controller may further include a dot compensating unit designed by a sub-module of the engine controller to provide the dot compensation.

The dot compensation unit may provide the dot compensation by delaying the video clock signal received by the HPVC corresponding to a number of dots for which to compensate.

The foregoing and/or other aspects and utilities of the general inventive concept may also be achieved by providing a dot compensation method of an image forming apparatus, the method including receiving input data and a clock signal, generating video data from the input data, providing dot compensation for a dot offset of the video data by delaying the video clock signal received by the HPVC corresponding to a number of dots for which to compensate, and outputting the dot offset-compensated video data.

The foregoing and/or other aspects and utilities of the general inventive concept may also be achieved by providing a computer-readable recording medium having embodied thereon a computer program to execute a method, wherein the method includes receiving input data and a clock signal, generating video data from the input data, providing dot compensation for a dot offset of the video data by delaying the video clock signal received by the HPVC corresponding to a number of dots for which to compensate, and outputting the dot offset-compensated video data.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
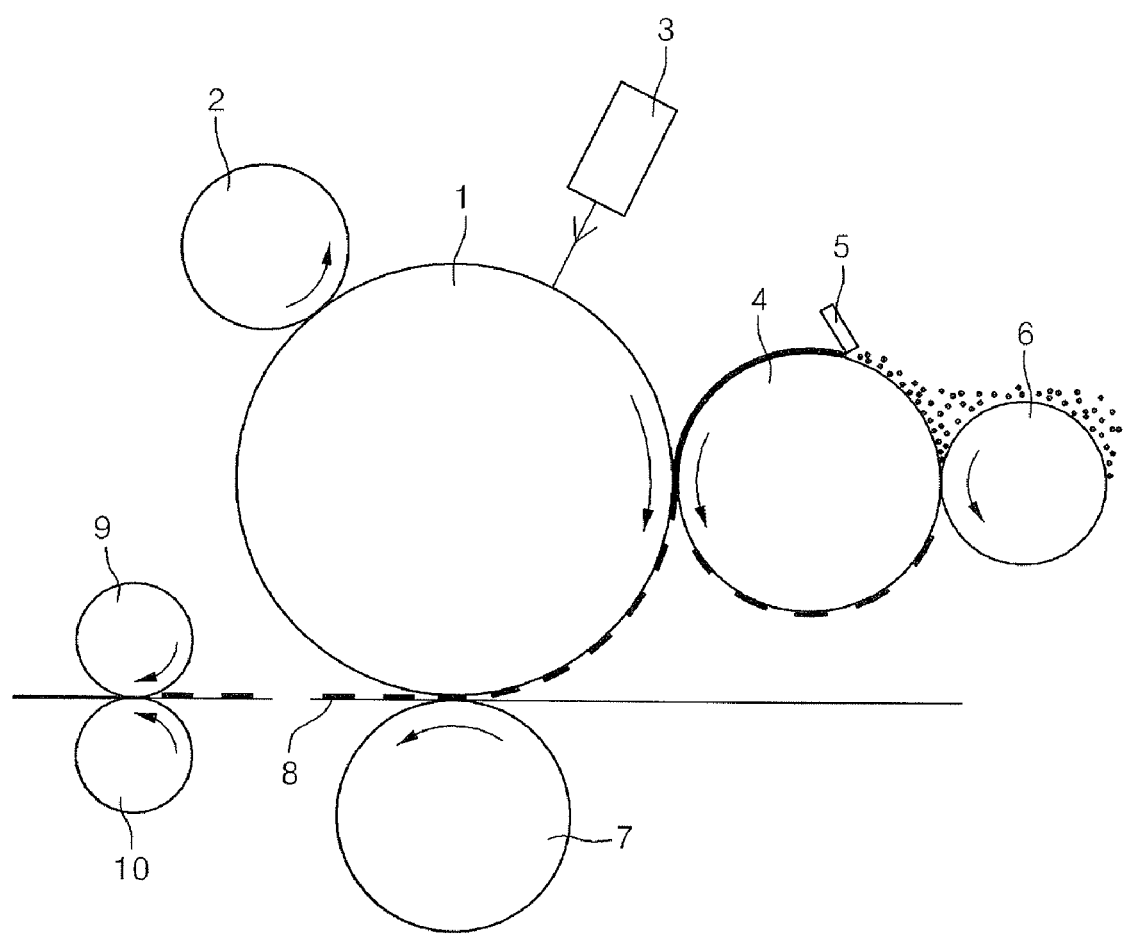
FIG. 1 is a schematic block diagram illustrating an image forming apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a schematic block diagram illustrating an image forming apparatus according to an embodiment of the present general inventive concept. As illustrated in FIG. 1, the image forming apparatus is configured so that a charge unit 2, a laser scanning unit 3 used as a lithography unit, a developing unit 4, a transferring unit 7, and fixing units 9 and 10 can be disposed at a periphery of a photoconductive drum 1. When a surface of the photoconductive drum 1 is charged through the charge unit 2, the surface is exposed by the laser scanning unit 3 and then forms an electrostatic latent image. The developing unit 4 develops the electrostatic latent image into a toner image of toner 8. The toner image is transferred to a recording medium through the transferring unit 7. The transferred toner image is fixed on the recording medium by the fixing units 9 and 10, and then the recording medium is conveyed to the outside.

The image forming apparatus further includes a regulator 5 to regulate a thickness of a developer on the developing unit 4 and a supply roller 6 to supply the developer to the developing unit 4.

Figure 2:
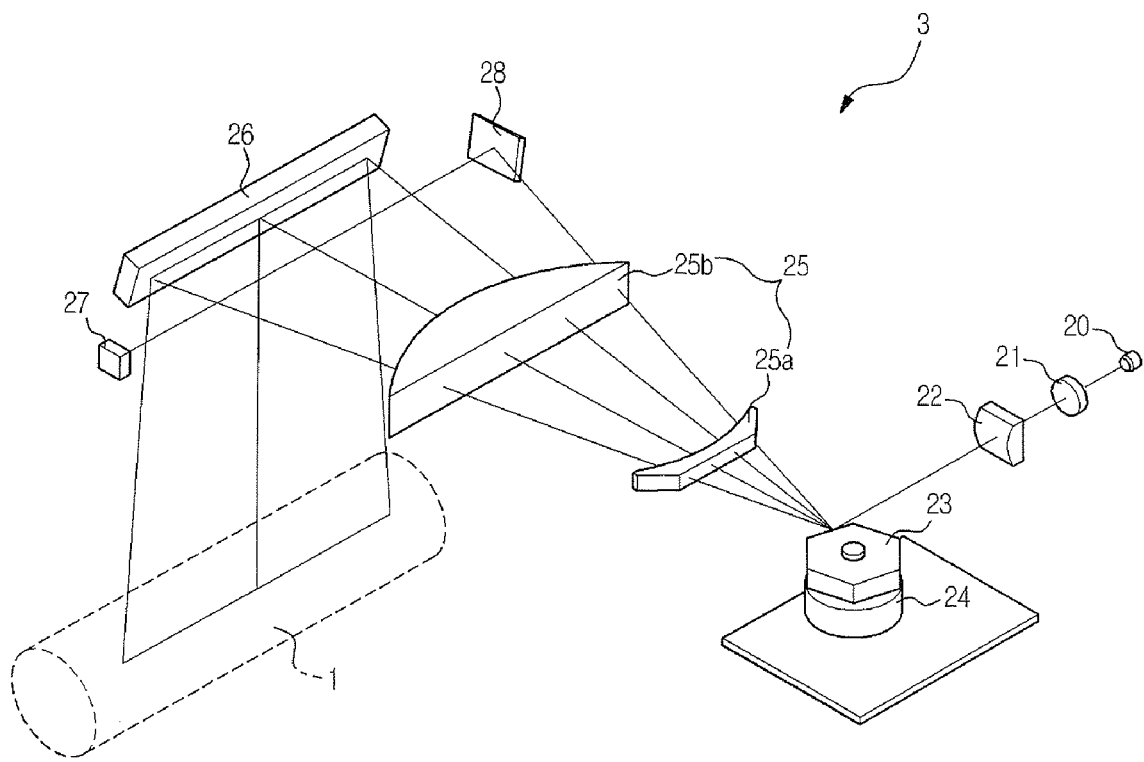
FIG. 2 is a detailed view illustrating the laser scanning unit illustrated in FIG. 1.

FIG. 2 is a detailed view illustrating the laser scanning unit illustrated in FIG. 1. Referring to FIG. 2, the laser scanning unit 3 includes a laser diode 20, a collimator lens 21, a cylinder lens 22, a polygon mirror 23, a polygon mirror driving motor 24, F-theta lenses 25, an image reflection mirror 26, a horizontal synchronous mirror 27, and an optical sensor 28.

The laser diode 20 serving as a light source emits a laser beam.

The collimator lens 21 collimates a laser beam emitted from the laser diode 20 to generate a parallel beam parallel to an optical axis.

The cylinder lens 22 focuses this parallel beam from the collimator lens 21 in a linear light orthogonal to a scanning direction.

Using a plurality of facets, the polygon mirror 23 is rotated at a constant linear velocity to scan linear light, which is orthogonal to the scanning direction and irradiated from the cylinder lens 22.

The polygon mirror driving motor 24 rotates the polygon mirror 23 at a constant linear velocity.

The F-theta lenses 25 have a negative refractive index with respect to the optical axis. The F-theta lenses 25 polarize the beam of a constant linear velocity from the polygon mirror 23 to the scanning direction and compensate for a spherical aberration to focus the beam on a scanned plane.

The image reflection mirror 26 reflects the laser beam from the F-theta lenses 25 in an orthogonal direction to form a spot image on the photoconductive drum 1 as an image plane.

The horizontal synchronous mirror 27 reflects the laser beam from the F-theta lenses 25 in the horizontal direction.

The optical sensor 28 receives the laser beam reflected from the horizontal synchronous mirror 27 and matches the optical sensor 28 with a horizontal synchronous signal. The F-theta lenses 25 includes a spherical-aberration compensating spherical lens 25a to collect and polarize a laser beam, refracted from the polygon mirror 23 at the constant linear velocity; and a Toric lens 25b to polarize the laser beam, whose spherical aberration is compensated through the spherical lens 25a in the scanning direction, with a constant refractive index. The F-theta lenses 25 perform an F-theta compensating operation so that the laser beam reflected from the polygon mirror 23 can be subjected to a same scanning distance on the photoconductive drum 1.

The horizontal synchronous signal is generated in the laser scanning unit 3 to test effective data. When the horizontal synchronous signal is provided to a hyper print video controller 30 (HPVC) (FIG. 3), a quantity of a line of print data stored in memory is provided to the laser scanning unit 3, so that the laser diode 20 is repeatedly turned on and off according to the corresponding print data. This results in formation of a print image corresponding to print data.

Figure 3:
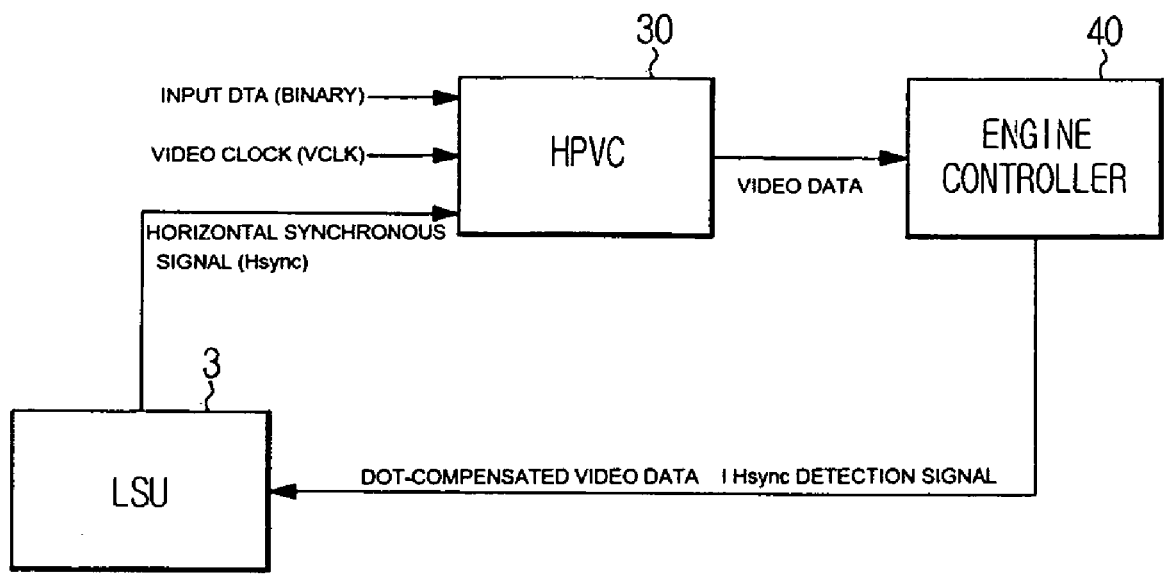
FIG. 3 is a schematic control block diagram illustrating an image forming apparatus according to an embodiment of the present general inventive concept.

FIG. 3 is a schematic control block diagram illustrating an image forming apparatus according to an embodiment of the present general inventive concept. The image forming apparatus includes the HPVC 30 and an engine controller 40.

Referring to FIG. 3, the HPVC 30, for example, receives a video clock signal and input data from a scanner or an external apparatus, for example, a host computer, and also receives a signal, i.e., horizontal synchronous signal, from the LSU, and generates video data from the input data according to the signal of the LSU.

The engine controller 40 calculates and compensates for a dot offset of the video data output from the HPVC 30. The engine controller 40 determines dot position and dot size of the video data whose dot offset is compensated for, and outputs the final video data.

The laser scanning unit 3 (LSU) performs a printing operation based on the final video data.

Figure 4:
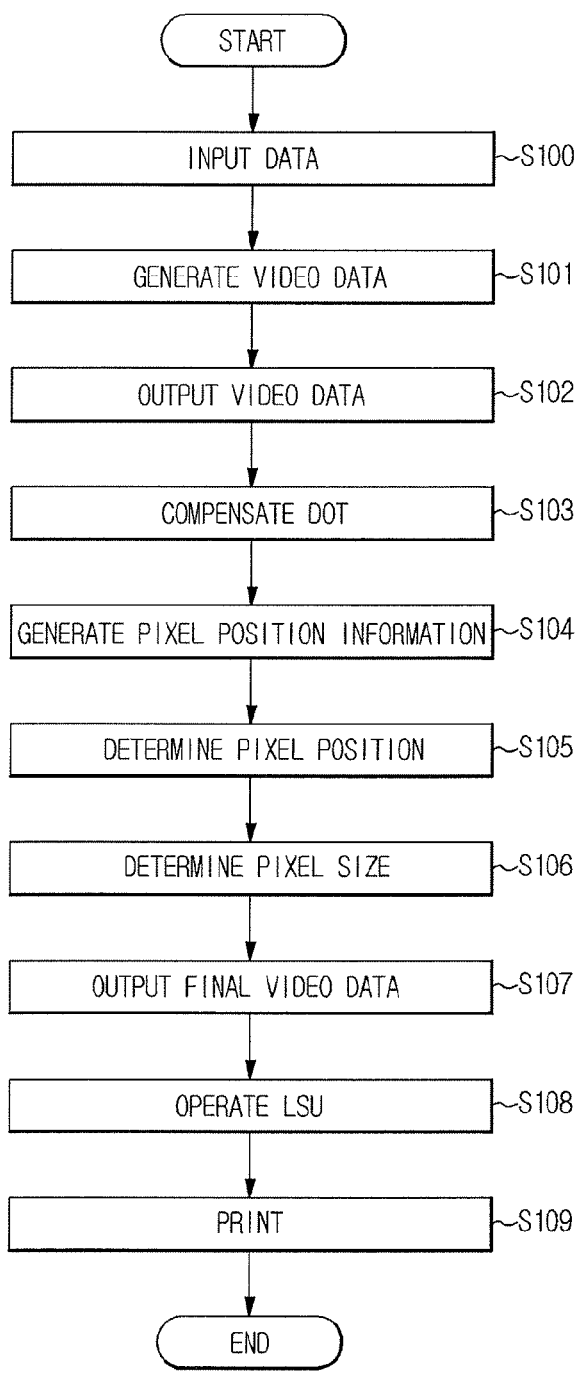
FIG. 4 is a flow chart illustrating a controlling method of the image forming apparatus illustrated in FIG. 3.

Referring to FIGS. 3 and 4, the image forming apparatus is operated as follows: The HPVC 30 inputs the input data (operation S100), generates video data from the input data (operation S101), and outputs the video data (operation S102). The engine controller 40 compensates for a dot offset of the video data (operation S103), generates pixel position information of the dot offset-compensated video data (operation S104), determines a pixel position and a pixel size of the dot offset-compensated video data (operations S105 and S106), and outputs the final video data to which the pixel position and pixel size of the dot offset-compensated video data is applied (operation S107). The laser scanning unit 3 operates (operation S108) and performs a printing operation (operation S109).

Figure 5:
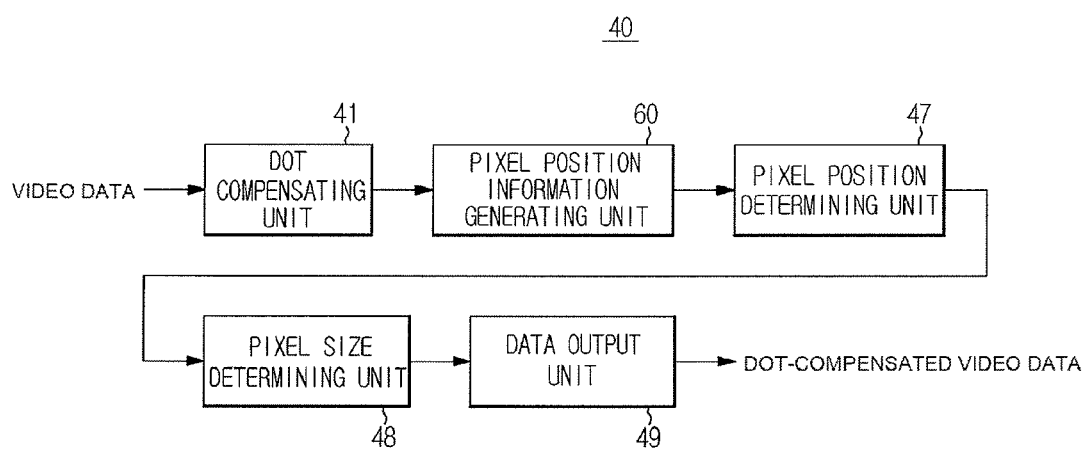
FIG. 5 is a schematic control block diagram illustrating the engine controller illustrated in FIG. 3.

The engine controller 40, as illustrated in FIG. 5, includes a dot compensating unit 41 to compensate for a dot offset of the video data output from the HPVC 30, a pixel position information generating unit 60 to generate pixel position information of the dot offset-compensated video data, a pixel position determining unit 47 to determine a pixel position of the dot offset-compensated video data according to the generated pixel position information, a pixel size determining unit 48 to determine a pixel size of the dot offset-compensated video data, and a data output unit 49 to output the final video data where a pixel position and a pixel size of the dot offset-compensated video data is determined.

Figure 6:
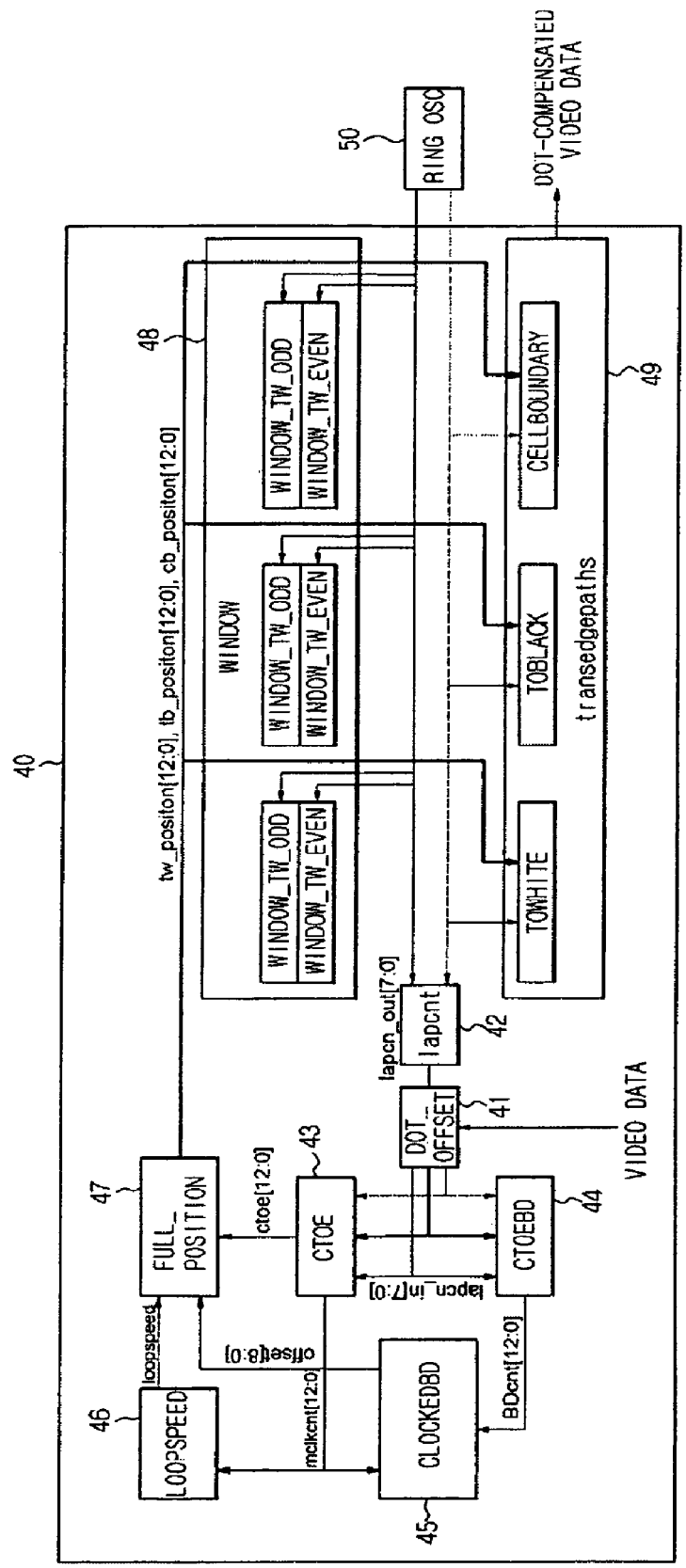
FIG. 6 is a detailed control block diagram illustrating the engine controller illustrated in FIG. 3.

The engine controller 40 inputs image data of TB and TW signals of the video data output from the HPVC 30, modifies the dot size and dot position of the input image data, and thus outputs the image at a high resolution. The engine controller 40 is operated by, for example, 18 signals (tap[15:0], tap0, tap0_n) from a ring oscillator 50 (Ring_osc) (FIG. 6). Therefore, the ring oscillator 50 can be fully designed to precisely operate the engine controller 40. Also, the ring oscillator 50 requires a particular design method since an oscillation frequency thereof varies according to a variation in an operation, voltage, or temperature. In addition, the ring oscillator 50 needs an additional power source during the layout since the oscillation frequency is changed according to high speed oscillation and switching. The ring oscillator 50 is operated in a fast mode, typical mode, and a slow mode, which are classified according to a delay between taps. The ring oscillator 50 is operated in a typical mode. These modes can be used according to the frequency of video clock (VCLK) and PPM.

As illustrated in FIG. 6, the engine controller 40 includes 9 sub-blocks 41~49 including dot offset 41; lapcnt 42; ctoe 43; ctoeBD 44; clockedBD 45; loopspeed 46; full_position 47; window 48; and transedgepaths 49. In particular, since the sub-block, transedgepaths 49, serves to output the final video, transedgepaths 49 layout position is important and transedgepaths 49 functions plays a key role in the engine controller.

The pixel position information generating unit 60 includes 5 sub-blocks including lapcnt 42; ctoe 43; ctoeBD 44; clockedBD 45; and loopspeed 46.

The first block 42, lapcnt, serves to obtain a tapcnt value using singles, tap0 and tap0_n, from the ring oscillator 50, Ring_osc. The first block 42, lapcnt, forms MSB [12:5] of mclkcnt in the second block 43, ctoe, which will be described later.

As described in the following Table 1, the second block 43, ctoe, is composed of 13 bits, lapcnt [7:0], obtained above, and encoding [4:0]. lapcnt [12:5] (MSB)+encoding [4:0] (LSB).

TABLE 1

| 12 | 11 | 10 | 9 | 8 | 7 | 6 | 5 | 4 | 3 | 2 | 1 | 0 |
|----|----|----|---|---|---|---|---|---|---|---|---|---|
| Tapcnt | | | | | | | | encoding | | | | |

The second block 43, ctoe, represents a value that is counted in a period of clock composed of tap0~tap15 between a VCLK and the following VCLK. A value of mclkcnt for a period of tap0 is 32 and is toggled 16 times for a half period.

The third block 44, ctoeBD, is obtained as the mclkcnt, obtained in the previous operation, counts the toggle values of TAP0~TAP15 at a rising edge of a VCLK. Similar to the method of obtaining the mclkcnt, BDcnt is obtained when BDcnt is synchronous to a BD_buff as an edge detection signal of a horizontal signal (BD) (Hsync) from the LSU 3. BDcnt is used to obtain a difference in position data (mclkcnt) synchronous to a VCLK, and to calculate position data compensating for offset to form a video clock synchronous to a BD.

The fourth block 45, clockedBD, serves to obtain an offset value using the mclkcnt, calculated in the second block 43, ctoe, and the BDcnt, obtained in the third block 44, ctoeBD. That is, Offset=BDcnt mclkcnt.

The fifth block 46, loopspeed, represents the tapcnt size of the ring oscillator 50 for a period of VCLK, corresponding to a resolving power that can resolve one dot. This value can also be calculated by the frequency of the tap0 and the VCLK. For example, when the frequency of the tap0 is 100 MHz and the frequency of the VCLK is 25 MHz, the resolving power of tap [15:0] is 3.2 GHz (=100 MHz×32). Therefore, loopspeed becomes 128 (3.2 GHz/25 MHz). However, when loopspeed is obtained at each period of VCLK, some problems may occur.

Since the oscillation frequency of the ring oscillator 50 is changed to 100 MHz~27 MHz, according to changes in states of the environment, during system operation, loopspeed is altered every time loopspeed is obtained at each VCLK. To compensate for this, loopspeed (an average accumulated for four periods of VCLK) is used for normalization of TB and TW signals. loopspeed 600 (an average accumulated for 6 periods of VCLK) is used to determine positions of CB, TB and TW in the six block 47, full_position.

The pixel position determining unit 47 (full_position) serves to determine a position to capture a video using the signals generated through the above operations. Position information is provided considering a latency time processed in the pixel size determining unit 48 (window) and the data output unit 49 (transedgepath) that generate an offset as position error data between BD (Hsync) and VCLK, phase compensating C_value, and modulated VCLK. cb_position represents position data that has a frequency of ½ VCLK and generates a VCLK whose duty rate is 50%. tw_position and tb_position provide position data to perform a modulating operation using the VCLK generated by the cb_position. Since it is increased by the ctoe value and the loopspeed value, the position data is changed synchronously with the VCLK.

Since a clock of VCLK, i.e., the loopspeed value is not normally 256, the HPVC 30 determines the size and position of one dot of TB and TW signals based on a resolution of 256 and normalizes and calculates TB and TW values. tb_normal=(tb*loopspeed)/255, tw_normal=(tw*loopspeed)/255.

The pixel size determining unit 48 (window) generates a window at a point where a video wave appears using the position value obtained above. The window generation acts to set a searching area and to track a precise position track. One window is generated when the upper 8 bits of the position data is identical to lapcnt[7:0] and bdapcnt[7:0]. To this end, a comparing operation and a determining operation according to a phase and polarity are additionally performed. The window generation structure is divided into even and odd numbers. Since the speed of the engine controller 40 is fast, the data cannot be processed in one mode, and instead is divided into even and odd numbers to be processed.

While the pixel size determining unit 48 opens one window, the data output unit 49 (transedgepaths) designates precise video data in the window. Also, the data pixel size determining unit 48 is precisely controlled by a signal of tap[15:0] of the ring oscillator 50, and as well, a function of the data pixel size determining unit 48 becomes an important block and a position of the data pixel size determining unit 48 can be carefully selected during the layout.

Referring to FIGS. 3 and 6, the dot compensating unit 41 (dot_offset) is an offset compensator to compensate for an offset dot. The dot compensating buffer in the conventional HPVC 30 is replaced with the dot compensating unit 41. As described above, the conventional dot compensating buffer includes 128 flip-flops to compensate for a maximum of 128 dots, thereby inefficiently increasing a number of gate counts. To efficiently perform this function, the dot compensating unit 41 (dot_offset) is designed by a sub-module of the engine controller 40 instead of the HPVC 30.

The function is described as follows.

One dot is compensated for at one period of video clock VCLK. Based on this concept, when ring_cnt 46 (loopspeed) representing a period of VCLK is processed by a product operation, a compensating operation can be easily performed. For example, in order to compensate for 7 dots, the operation is Dot_compensation=ring_cnt*7.

As described above, the dot compensating unit 41 of the engine controller 40 can easily perform a dot operation for the video signal that is not subject to a dot compensating operation in the HPVC 30. The operating principle is as follows. The video signal is synchronous to the VCLK, so that one dot (pixel) is printed at one clock. When 3 dots require a delay due to a shake of the laser beam, the ring_cnt formed in the engine controller 40 (a signal with a period of VCLK) occurs three times. Therefore, the VCLK undergoes 3 clock delays and thus the three dots can be compensated for. Since a number of laser beams is identical to that of the engine controller 40, when a starting position of a video signal for each laser beam is misaligned, the misalignment can be compensated for by a simple compensating circuit of the engine controller 40. Therefore, the circuit can be simply configured. That is, the dot compensating buffer can be removed from each stage of the HPVC 30, which reduces total space.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains. The method illustrated in FIGS. 4 and 5 can be stored in the computer-recorded medium in a form of computer-readable codes to perform the method when the computer reads the computer-readable codes of the recording medium.

As is apparent from the above description, the image forming apparatus according to various embodiments of the present general inventive concept is configured in such way to include an engine controller to compensate for dots, without installation of a dot compensating buffer of the HPVC, thereby allowing the HPVC to be small so that chip size can be reduced. A reduction in size accordingly reduces power consumption, and enhances chip efficiency.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. An image forming apparatus, comprising:
   a hyper print video controller (HPVC) to generate video data from input data according to a first synchronous signal;
   an engine controller to compensate for a dot offset of the video data and to output the dot offset-compensated video data; and
   a laser scanning unit to perform a print operation and to output a second synchronous signal to the HPVC according to the dot offset-compensated video data, the second synchronous signal replacing the first synchronous signal.

2. The image forming apparatus of claim 1, wherein the engine controller comprises:
   a dot compensating unit to calculate and compensate for a dot offset of the video data.

3. The image forming apparatus of claim 2, wherein the dot compensating unit delays periods of video clock of a ring oscillator to provide a reference video clock to the engine controller by a number of dots, and to compensate for a dot offset.

4. The image forming apparatus of claim 3, wherein the dot compensating unit delays N periods of the video clock of the ring oscillator to compensate for N dot delays.

5. The image forming apparatus of claim 2, wherein the engine controller comprises:
   a pixel position information generating unit to generate pixel position information of the video data whose dot offset is compensated for by the dot compensating unit;
   a pixel position determining unit to determine a pixel position of the dot offset-compensated video data according to the generated pixel position information;
   a pixel size determining unit to determine a pixel size of the dot offset-compensated video data according to the generated pixel position information; and
   a data output unit to output final video data whose pixel position and pixel size for the dot offset-compensated video data are determined.

6. The image forming apparatus of claim 1, further comprising:
   a ring oscillator to generate an oscillating signal having a frequency that varies according to an error during the print operation.

7. The image forming apparatus of claim 6, wherein the engine controller compensates for a dot offset of the video data by determining the dot offset corresponding to the video data based on the frequency of the oscillating signal, modifying a dot position and a dot size of the video data based on the dot offset, and outputting the modified video data to the laser scanning unit to perform the print operation according to the modified video data until the print operation is complete.

8. The image forming apparatus, of claim 7, wherein the engine controller is external from the HPVC.

9. A method of controlling an image forming apparatus, the method comprising:
   generating video data from input data in a hyper print video controller (HPVC) according to a first synchronous signal and outputting the video data;
   compensating for a dot offset of the video data in an engine controller, and outputting the dot offset-compensated video data;
   performing a printing operation through a laser scanning unit, according to the dot offset-compensated video data; and outputting a second synchronous signal to the HPVC according to the dot offset-compensated video data, the second synchronous signal replacing the first synchronous signal.

10. The method of claim 9, wherein the compensating a dot offset of the video data comprises:
delaying periods of a video clock of a ring oscillator providing a reference video clock to the engine controller by a number of dots to be compensated for.

11. The method of claim 9, wherein the compensating a dot offset of the video data comprises:
delaying video N periods of a video clock of a ring oscillator providing a reference video clock to the engine controller and compensating for N dot delays.

12. The method of claim 9, further comprising:
generating pixel position information of the dot offset-compensated video data;
determining a pixel position and pixel size of the dot offset-compensated video data according to the generated pixel position information; and
outputting final video data to which the determined pixel position and pixel size are applied.

13. An image forming apparatus, comprising:
a hyper print video controller (HPVC) to generate video data from input data according to a first signal;
an engine controller to compensate for a dot offset of the video data and to output the dot offset-compensated video data; and
a laser scanning unit to perform a print operation and to output a second synchronous signal to the HPVC according to the dot offset-compensated video data, the second synchronous signal replacing the first synchronous signal,
wherein the engine controller includes a dot compensating unit to delay periods of a video clock of a ring oscillator providing a reference video clock to the engine controller by a number of dots, and to compensate for the dot offset, and
the dot compensating unit delays N periods of the video clock and compensates for N dot delays.

14. An image forming apparatus, comprising:
a hyper print video controller (HPVC) to receive input data and a clock signal, and to generate video data from the input data according to a first synchronous signal; and
an engine controller to provide dot compensation for a dot offset of the video data and to output the dot offset-compensated video data,
wherein the dot compensation is performed without a dot compensating buffer and a second synchronous signal is generated according to the dot offset-compensated video data to replace the first synchronous signal.

15. The apparatus of claim 14, wherein the engine controller further comprises:
a dot compensating unit designed by a sub-module of the engine controller to provide the dot compensation.

16. The apparatus of claim 15, wherein the dot compensation unit provides the dot compensation by delaying the video clock signal received by the HPVC corresponding to a number of dots for which to compensate.

17. A dot compensation method of an image forming apparatus, the method comprising:
receiving input data and a clock signal,
generating video data from the input data according to a first synchronous signal;
providing dot compensation for a dot offset of the video data by delaying the video clock signal received by a hyper print video controller (HPVC) corresponding to a number of dots for which to compensate;
outputting the dot offset-compensated video data; and
outputting a second synchronous signal to the HPVC according to the dot offset-compensated video data, the second synchronous signal replacing the first synchronous signal.

18. A non-transitory computer-readable recording medium having embodied thereon a computer program to execute a method, wherein the method comprises:
receiving input data and a clock signal,
generating video data from the input data according to a first synchronous signal;
providing dot compensation for a dot offset of the video data by delaying the video clock signal received by a hyper print video controller (HPVC) corresponding to a number of dots for which to compensate;
outputting the dot offset-compensated video data; and
outputting a second synchronous signal to the HPVC according to the dot offset-compensated video data, the second synchronous signal replacing the first synchronous signal.

* * * * *